United States Patent [19]

Konopka

[11] Patent Number: 5,191,263

[45] Date of Patent: Mar. 2, 1993

[54] BALLAST CIRCUIT UTILIZING A BOOST TO HEAT LAMP FILAMENTS AND TO STRIKE THE LAMPS

[75] Inventor: John G. Konopka, Barrington, Ill.

[73] Assignee: Motorola Lighting, Inc., Buffalo Grove, Ill.

[21] Appl. No.: 845,568

[22] Filed: Mar. 4, 1992

[51] Int. Cl.⁵ .............................................. H05B 41/29
[52] U.S. Cl. ................................ 315/209 R; 315/219; 315/226; 315/291; 315/DIG. 2
[58] Field of Search ................... 315/209 R, 226, 291, 315/307, DIG. 2, DIG. 5, DIG. 7, 219

[56] References Cited

U.S. PATENT DOCUMENTS

| | | | |
|---|---|---|---|
| 4,388,562 | 6/1983 | Josephson | 315/DIG. 7 |
| 5,019,959 | 5/1991 | MacDonald et al. | 315/105 |
| 5,063,331 | 11/1991 | Nostwick | 315/DIG. 7 |

Primary Examiner—David Mis
Attorney, Agent, or Firm—J. Ray Wood

[57] ABSTRACT

A driver circuit for one or more gas discharge lamps (102, 104, 106) includes: a self-oscillating, series-resonant oscillator (196, 198, 178, 180) for producing a constant-frequency, high-frequency output voltage for application to the lamps; an inductive voltage boost IC (144) for causing the oscillator to produce a temporary excessive boosted output voltage (300 V) when the voltage boost IC is initially activated and a steady-state boosted output voltage (250 V) thereafter, ensuring striking of the lamps and prolonging their life.

12 Claims, 2 Drawing Sheets

BALLAST CIRCUIT UTILIZING A BOOST TO HEAT LAMP FILAMENTS AND TO STRIKE THE LAMPS

BACKGROUND OF THE INVENTION

This invention relates to circuits for driving gas discharge lamp loads, and particularly, though not exclusively, to circuits for driving fluorescent lamps.

It is well known that gas discharge lamps such as fluorescent lamps are hard to start under cold conditions, and that consequently greater voltage must be applied to such a lamp during the starting process in order to ensure a fast and complete strike of the lamp. In practice a driver circuit must combine the production of such a high voltage during starting with the production of a low voltage during no-load conditions.

In known prior art fluorescent lamp driving circuits this combination of operating modes is achieved by varying the circuit's operating frequency during start-up.

However, such a circuit with variable operating frequency suffers from disadvantages such as reduced stability and efficiency of operation.

SUMMARY OF THE INVENTION

In accordance with the invention there is provided a circuit for driving a gas discharge lamp load, the circuit comprising:

input terminals for connection to a source of voltage supply;

output terminals for connection to the filaments of the gas discharge lamp;

oscillator means coupled to the input terminals and to the output terminals for producing an output voltage for application to the gas discharge lamp load, the output voltage having a substantially constant high frequency;

voltage boost means coupled to the input terminals and to the oscillator means for causing the oscillator means to produce a boosted output voltage when the voltage boost means is activated; and voltage boost temporary excess activation means coupled to the voltage boost means for activating the voltage boost means to cause an excessive boosted output voltage to be produced during a temporary activation period at start-up.

It will be understood that such a circuit ensures satisfactory starting of the gas discharge lamp load at start-up, and produces a normal boosted voltage for driving the lamps after the temporary activation period at start-up, while allowing the circuit to operate with optimal stability and efficiency at a substantially constant high frequency.

BRIEF DESCRIPTION OF THE DRAWINGS

One fluorescent lamp driver circuit in accordance with the present invention will now be described, by way of example only, with reference to the accompanying drawings, in which.

DESCRIPTION OF THE PREFERRED EMBODIMENT

Figure 1:
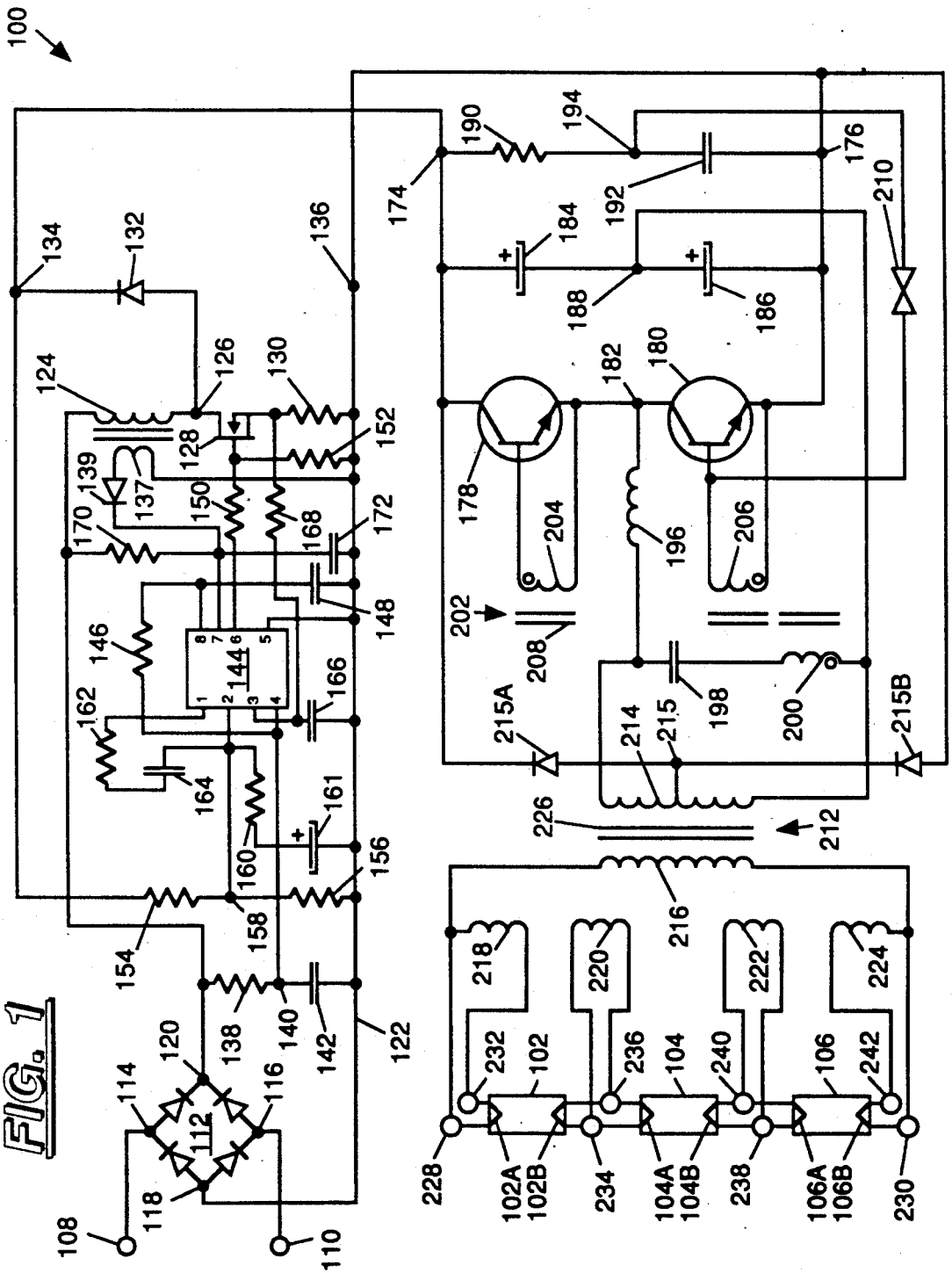
FIG. 1 shows a schematic circuit diagram of a driver circuit for driving three fluorescent lamps.

Referring now to FIG. 1, a circuit 100, for driving three fluorescent lamps 102, 104, 106, has two input terminals 108, 110 for receiving thereacross an AC supply voltage of approximately 120 V at a frequency of 60 Hz. A full-wave rectifying bridge circuit 112 has two input nodes 114, 116 connected respectively to the input terminals 108, 110, and has two output nodes 118, 120. The output node 118 of the bridge 112 is connected to a ground voltage rail 122.

A cored inductor 124 (having an inductance of approximately 1 mH) has one end connected to the output node 120 of the bridge 112, and has its other end connected to a node 126. A field effect transistor (FET) 128 (of the type BUZ90) has its drain electrode connected to the node 126. The field effect transistor (FET) 128 has its source electrode connected, via a resistor 130 (having a value of approximately 0.56Ω), to the ground voltage rail 122. A diode 132 (of the type MUR160) has its anode connected to the node 126 and has its cathode connected to an output node 134. The ground voltage rail 122 is connected to an output node 136.

A resistor 138 (having a resistance of approximately 720KΩ) is connected between the output node 120 of the bridge 112 and a node 140. A capacitor 142 (having a capacitance of approximately 0.0039 μF) is connected between the node 140 and the ground voltage rail 122. A current-mode control integrated circuit (IC) 144 (of the type UC2845, available from MOTOROLA Semiconductor) has its $R_T/C_T$ input (pin 4) connected to the node 140. The Current mode control IC 144 has its $V_{REG}$ output (pin 8) connected, via a resistor 146 (having a desistance of approximately 10KΩ), to the node 140 and connected, via a capacitor 148 (having a capacitance of approximately 0.22 μF) to the ground voltage rail 122. The current mode control IC 144 has its control signal output (pin 6) connected, via a resistor 150 (having a resistance of approximately 20 Ω), to the gate electrode of the FET 128. The gate electrode of the FET 128 is also connected, via a resistor 152 (having a resistance of approximately 22KΩ), to the ground voltage rail 122.

Two resistors 154, 156 (having respective resistances of approximately 400KΩ and 4.02KΩ) are connected in series, via an intermediate node 158, between the output terminal 134 and the ground voltage rail 122. The current mode Control IC 144 has its $V_{FB}$ input (pin 2) connected to the node 158. The $V_{FB}$ pin (pin 2 of the IC 144) is also connected via a series-connected resistor 160 (having a resistance of approximately 18KΩ) and an electrolytic capacitor 161 (having a capacitance of approximately 100 μF) to the ground voltage rail 122. The current mode control IC 144 has its COMP output (pin 1) connected to its $V_{FB}$ input (pin 2) via a series-connected resistor 162 (having a resistance of approximately 100KΩ) and capacitor 164 (having a capacitance of approximately 0.1 μF). The current mode control IC 144 has its current sense input (pin 3) connected to the ground voltage rail 122 via a capacitor 166 (having a capacitance of approximately 470 pF) and to the source electrode of the FET 128 via a resistor 168 (having a resistance of approximately 1KΩ).

The current mode control IC 144 has its $V_{cc}$ input (pin 7) connected to the bridge rectifier output node 120 via a resistor 170 (having a resistance of approximately 94KΩ) and connected to the ground voltage rail 122 via a capacitor 172 (having a capacitance of approximately 100 μF). The current mode control IC 144 has its GND input (pin 5) connected to the ground voltage rail 122. A winding 137, wound on the same core as the inductor 124, has one end connected to the ground voltage rail 122 and has its other end connected via a diode 139 to the $V_{cc}$ input (pin 7) of the IC 144.

The power supply output terminals 134 and 136 are connected to input nodes 174 and 176 of a half-bridge inverter formed by two npn bipolar transistor 178 and 180 (each of the type BUL146). The transistor 178 has its collector electrode connected to the input node 174, and has its emitter electrode connected to an output node 182 of the inverter. The transistor 180 has its collector electrode connected to the node 182, and has its emitter electrode connected to the input node 176. Two electrolytic capacitors 184 and 186 (each having a value of approximately 100 μF) are connected in series between the inverter input nodes 174 and 176 via an intermediate node 188. For reasons which will be explained below, a resistor 190 (having a value of approximately 1MΩ) and a capacitor 192 (having a value of approximately 0.1 μF) are connected in series between the inverter input nodes 174 and 176 via an intermediate node 192.

The inverter output node 182 is connected to a series-resonant tank circuit formed by an inductor 196 (having a value of approximately 700 μH) and a capacitor 198 (having a value of approximately 15 nF). The inductor 196 and the capacitor 198 are connected in series, via a primary winding 200 of a base-coupling transformer 202 which will be described more fully below, between the inverter output node 182 and the node 188. The base-coupling transformer 202 includes the primary winding 200 (having approximately 8 turns) and two secondary windings 204 and 206 (each having approximately 24 turns) wound on the same core 208. The secondary windings 204 and 206 are connected with opposite polarities between the base and emitter electrodes of the inverter transistors 178 and 180 respectively. For reasons which will be explained below, the base electrode of the transistor 180 is connected via a diac 210 (having a voltage breakdown of approximately 32 V) to the node 194.

An output-coupling transformer 212 has its primary winding 214 connected series with the inductor 196 and in parallel with the capacitor 198 and the primary winding 200 of the base-coupling transformer 202 to conduct output current from the tank circuit formed by the series-resonant inductor 196 and capacitor 198. The primary winding 214 of the transformer 212 is tapped at a node 215, which is coupled to the inverter input nodes 174 and 176 via diodes 215A and 215B respectively.

The output-coupling transformer 212 includes the primary winding 214 (having approximately 91 turns), a principal secondary winding 216 (having approximately 280 turns) and four filament-heating secondary windings 218, 220, 222 and 224 (each having approximately 3 turns) wound on the same core 226. The principal secondary winding 216 is connected across output terminals 228 and 230, between which the three fluorescent lamps 102, 104 and 106 are connected in series. The lamps 102, 104 and 106 each have a pair of filaments 102A and 102B, 104A and 104B and 106A and 106B respectively located at opposite ends thereof. The filament-heating secondary winding 218 is connected across the output terminal 228 and an output terminal 232, between which the filament 102A of the lamp 102 is connected. The filament-heating secondary winding 220 is connected across output terminals 234 and 236, between which both the filament 102B of the lamp 102 and the filament 104A of the lamp 104 are connected in parallel. The filament-heating secondary winding 222 is connected across output terminals 238 and 240, between which both the filament 104B of the lamp 104 and the filament 106A of the lamp 106 are connected in parallel. The filament-heating secondary winding 224 is connected across the output terminal 230 and an output terminal 242, between which the filament 106B of the lamp 106 is connected.

The integrated circuit 144 and its associated components form a voltage boost circuit which produces, when activated, a boosted output voltage between the output terminals 134 and 136. The detailed operation of such a voltage boost circuit is described more fully in, for example, U.S. patent application No. 07/665,830, which is assigned to the same assignee as the present application, and the disclosure of which is hereby incorporated herein by reference.

The transistors 178 and 180, the inductor 196, the capacitor 198 and their associated components form a self-oscillating inverter circuit which produces, when activated, a substantially constant frequency, high-frequency (e.g. 38 KHz) AC voltage across the primary winding 214 of the output-coupling transformer 212. The voltages induced in the secondary windings 218, 220, 222 and 224 216 of the output-coupling transformer serve to heat the lamp filaments 102A and 102B, 104A and 104B and 106A and 106B and the voltage induced in the secondary winding 216 of the output-coupling transformer serves to drive current through the lamps 102, 104 and 106. The detailed operation of such a circuit is described more fully in, for example, U.S. Pat. No. 5,148,087, entitled "Circuit for Driving a Gas Discharge Lamp Load", invented by Mihail S. Moisin and John G. Konopka, and assigned to the same assignee as the present application. The disclosure of this patent is hereby incorporated herein by reference.

In operation of the circuit of FIG. 1, with a voltage of 120 V, 60 Hz applied across the input terminals and 110, the bridge 112 produces between the node 120 and the ground voltage rail 122 a unipolar, full-wave rectified, DC voltage having a frequency of 120 Hz.

When the circuit is first powered-up, the activation of the voltage boost IC 144 is controlled, for reasons which will be explained below, by the resistive-capacitive divider 170, 172 connected between the output nodes 118 and 120 of the bridge circuit 112. When the bridge circuit 112 first produces the DC voltage between its output nodes 118 and 120, this current begins to flow through the resistor 170 and begins to charge the capacitor 172. The voltage across the capacitor thus increases at a rate dependent on its own value and that of the resistor 170. When the voltage across the capacitor 172 reaches the turn-on threshold value of the IC 144 this voltage, applied at pin 7 of the IC 144, activates the IC to boost the voltage between the output terminals 134 and 136. Once initially activated, the winding 137 acts as a "bootstrap" voltage supply, ensuring that the IC 144 remains activated. For reasons which will be explained below the component values in the preferred embodiment of the circuit of FIG. 1 are chosen to produce a delay of approximately 0.7 seconds between initial power-up of the circuit and activation of the voltage boost IC 144.

If the voltage boost IC 144 is not activated, an unboosted voltage appears across the output terminals 134 and 136 and powers the self-oscillating inverter. In the preferred embodiment of the circuit of FIG. 1 the unboosted voltage produced across the output terminals 134 and 136 has a value of approximately 170 V. As will be explained in more detail below, when the self-oscillating inverter is powered by the unboosted bridge voltage it produces enough voltage in the transformer primary winding 214 for the induced currents in the secondary windings 218, 220, 222 and 224 to heat the filaments 102A and 102B, 104A and 104B and 106A and 106B, but does not produce enough voltage for the induced voltage in the secondary winding 216 to cause the lamps 102, 104 and 106 to strike.

When the voltage boost IC 144 is activated, it produces a pulse-width modulated signal at its pin 6 which controls the conduction of the FET 128. When the FET 128 is enabled to conduct, substantially the whole of the unipolar DC voltage produced by the bridge 112 appears across the inductor 124, and causes current to flow through the inductor. When the FET 128 is disabled from conducting, this inductive current causes the voltage across the inductor to increase. This increased or boosted voltage is applied through the diode 132 to the output terminal 134. The boosted voltage between the output terminals 134 and 136 charges the capacitor 137 to produce an output voltage across the output terminals 134 and 136 which powers the self-oscillating inverter. In the preferred embodiment of the circuit of FIG. 1, when the circuit is operating in steady-state mode with the lamps 102, 104 and 106 struck and the capacitor 161 fully charged, the boosted voltage across the output terminals 134 and 136 has a value of approximately 250 V. This steady-state boosted output voltage is sufficient to maintain discharge in the lamps 102, 104 and 106 to strike and to continue to cause the filaments 102A and 102B, 104A and 104B and 106A and 106B to be heated.

It will be understood that in the self-oscillating inverter formed by the transistors 178 and 180, the inductor 196, the capacitor 198 and their associated components, the inductor 196 and the capacitor 198 form an LC series-resonant circuit which, energized by the applied boosted or unboosted voltage across the output terminals 134 and 136 via the inverter formed by the transistors 178 and 180, resonates at a nominal loaded, substantially constant, frequency of approximately 38 KHz. The high-frequency voltage produced by the resonant circuit appears across the primary winding 214 of the transformer 212 and induces a relatively high voltage in the secondary winding 216 and relatively low voltages in the secondary windings 218, 220, 222 and 224. The relatively low voltages in the secondary windings 218, 220, 222 and 224 produce heating currents in the filaments and the relatively high voltage in the secondary winding 216 is applied across the three lamps 102, 104 and 106 in series, and will cause the lamps to strike if the voltage across the secondary winding 216 is high enough.

When the circuit is first powered-up, the activation of the self-oscillating inverter, for reasons which will be explained below, is controlled by the resistive-capacitive divider 190, 192 connected between the output terminals 134 and 136 of the voltage boost circuit formed by the IC 144 and its associated components. When the bridge circuit 112 first produces the DC voltage between its output nodes 118 and 120 and before the voltage boost IC 144 is activated, an unboosted voltage of approximately 170 V is produced across the output terminals 134 and 136. This unboosted voltage causes current to begin to flow through the resistor 190 and to begin to charge the capacitor 192. The voltage across the capacitor 192 thus increases at a rate dependent on its own value and that of the resistor 190. When the voltage across the capacitor 172 reaches the breakdown value of the diac 210 (approximately 32 V) this voltage is applied through the diac to the base of the transistor 180. This applied voltage causes the transistor 180 to turn on, and sets into operation the self-oscillating inverter formed by the transistors 178 and 180, the inductor 196, the capacitor 198 and their associated components. For reasons which will be explained below the component values in the preferred embodiment of the circuit of FIG. 1 are chosen to produce a delay of approximately 40 milliseconds between initial power-up of the circuit and activation of the self-oscillating inverter.

As mentioned above, the circuit of FIG. 1 is so arranged that, with the self-oscillating inverter activated, when the unboosted voltage of approximately 170 V appears across the output terminals 134 and 136 the voltage induced in the secondary windings 118, 120, 122 and 124 is sufficient to produce significant heating of the filaments 102A and 102B, 104A and 104B and 106A and 106B, but the voltage induced in the secondary winding 216 is insufficient to cause the lamps to strike. However, as will be explained in further detail below, when the voltage boost IC 144 is initially activated it causes an initial, temporary boosted voltage of approximately 300 V to appear across the output terminals 134 and 136, which excessive voltage ensures the rapid striking of even a cold lamp 102, 104 or 106. When the lamps strike, this boosted output voltage falls to the steady-state value of approximately 250 V, which is sufficient to maintain discharge in the lamps and to continue to heat their filaments.

Figure 2:
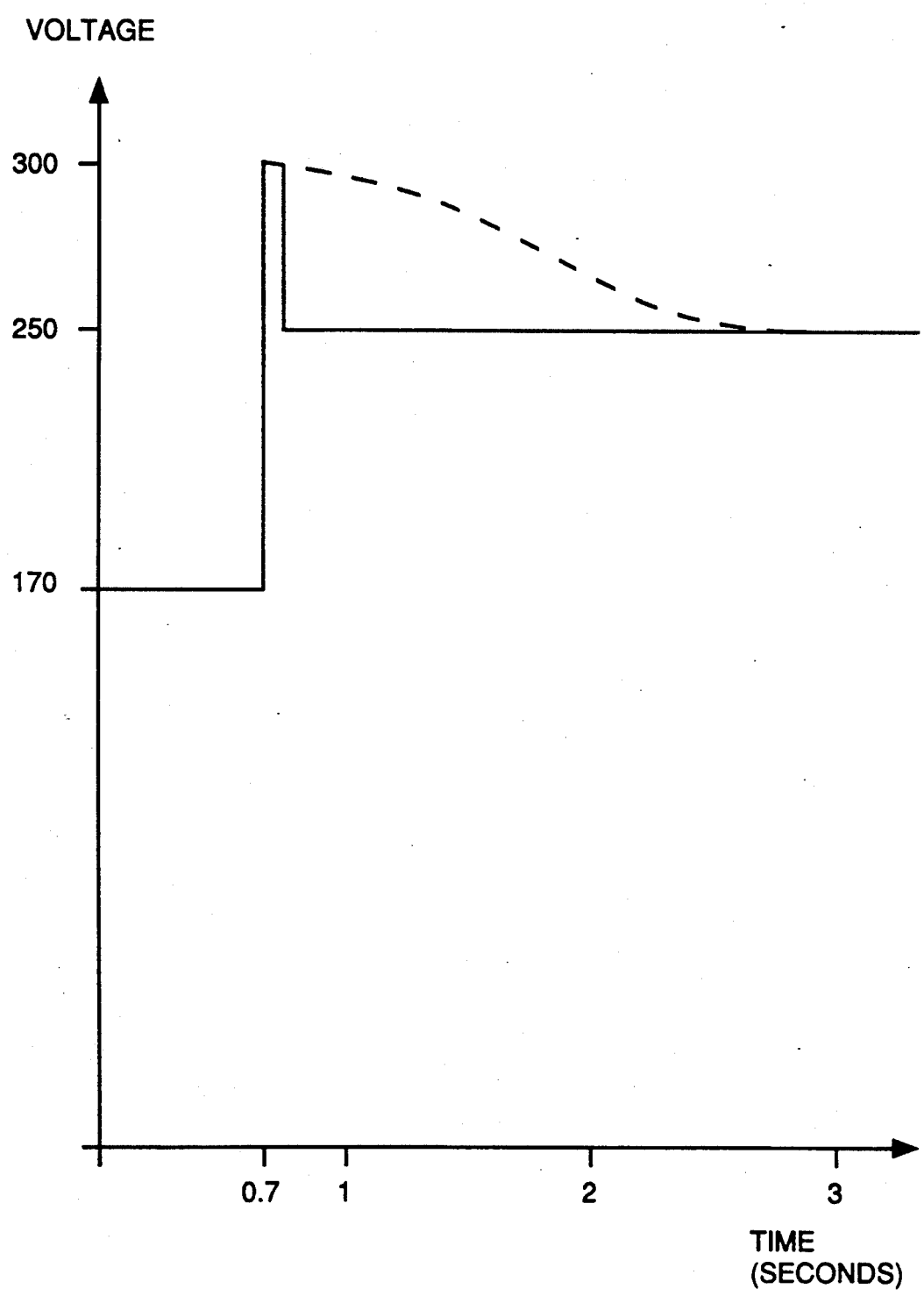
FIG. 2 shows a graphical representation of the voltage boost output voltage produced in the circuit of FIG. 1 at start-up.

Referring now also to FIG. 2, when the circuit 100 is operating in its steady-state mode (with the capacitor 161 fully charged) and the voltage boost IC 144 is causing a boosted output of approximately 250 V to appear across the output terminals 134 and 136, the values of the resistors 154 and 156 are chosen so that a feedback voltage of approximately 2.5 V is applied to the $V_{FB}$ pin (pin 2) of the voltage boost IC 144. When the voltage boost IC is initially activated, the capacitor is uncharged and so, while it is charging, causes the voltage at the $V_{FB}$ pin of the voltage boost IC 144 to be pulled below 2.5 V. By decreasing the feedback voltage appearing at the $V_{FB}$ pin of the voltage boost IC 144, the IC 144 is caused to produce a higher boosted output voltage across the output terminals 134 and 136. This initial, excess boosted output voltage begins immediately to decay as the capacitor 161 charges.

This excess boosted voltage ensures the striking of even a cold lamp 102, 104 or 106. As soon as the lamps are struck, the operation of the IC 144 becomes governed by current mode control and the boosted output voltage across the terminals 134 and 136 falls immediately to the steady-state value of approximately 250 V. In the event that the lamps do not strike, the boosted output voltage continues to decay (as shown in dotted line form in FIG. 2) from its initial excessive value of approximately 300 V until the capacitor 161 becomes fully charged, at which point the boosted output voltage has its steady-state value of approximately 250 V.

In the preferred embodiment, values of the components 160 and 161, which govern respectively the initial level of the excess voltage and its subsequent rate of decay, are chosen so as to produce an initial boosted output voltage having a value of approximately 300 V and a having a subsequent decay with a time constant of approximately 1.8 seconds. It will of course, be appreciated that the component values may be changed if desired to produce an initial excess voltage which is higher (increasing the insurance that the lamps will strike) or lower, or producing a subsequent decay or "time-out" which is longer or shorter.

It will be appreciated that the circuit of FIG. 1 completely separates the pre-heating phase from the striking phase of operation, and so enables the pre-heating to be performed optimally (e.g. with a steady heating current at a value chosen to provide the minimum safe delay before striking), and that when the voltage boost is initially activated it produces an excess boosted output voltage, ensuring that the lamps strike. It will further be appreciated that such optimal starting performance is effected simply and at minimal cost of additional components and does not compromise the stability or efficiency of the circuit's steady state performance. It will also be appreciated that by providing safe pre-heating before striking, and ensuring that striking occurs at an excessive voltage at the desired time, prolonged lamp life is assured.

It will also be appreciated that in addition to ensuring the striking of cold lamps, the circuit of FIG. 1 provides reliable and rapid starting of lamps at normal temperature. Typically, it has been found that the circuit of FIG. 1 reduces the total time from circuit power-on to striking of the lamps from 1.5 to 0.75 seconds. It has also been found that, by ensuring a rapid transition from the lamps, unstruck to struck states, the circuit of FIG. 1 prolongs the lamp life.

It will be appreciated that although there has been described a temporary, excess activation of a voltage boost IC by utilizing a resistor and a capacitor connected to its feedback input, other means for achieving a temporary, excess voltage boost activation may alternatively be used.

It will be appreciated that although in FIG. 1 there has been described a circuit for driving three lamps, the invention is not restricted to the driving of three lamps. It will be understood that the invention is also applicable to circuits for driving any other number of lamps.

It will be appreciated that the particular delays involved in activating the different sub-components of the circuit of FIG. 1 and the particular voltage levels may be varied as desired to suit different types of fluorescent or other gas discharge lamps.

It will be appreciated that various other modifications or alternatives to the above described embodiment will be apparent to a person skilled in the art without departing from the inventive concept.

I claim:
1. A circuit for driving a gas discharge lamp load, the circuit comprising:
input terminals for connection to a source of AC power;
output terminals for connection to the gas discharge lamp load;
a rectifier coupled to the input terminals for converting the AC power into DC power;
voltage boost means coupled to the rectifier for increasing the voltage of the DC power;
oscillator means coupled to the voltage boost means and to the output terminals for producing AC power at an AC output voltage from the DC power for application to the gas discharge lamp load, the AC output power having a substantially constant high frequency; and
voltage boost temporary excess activation means coupled to the voltage boost means for causing an excessive boosted output voltage to be produced by the voltage boost during a temporary activation period at start-up.

2. A circuit according to claim 1 wherein the oscillator means comprises a self-oscillating series-resonant circuit.

3. A circuit according to claim 1 wherein the voltage boost means comprises an inductive boost circuit.

4. A circuit according to claim 3 wherein the inductive boost circuit includes a voltage boost integrated circuit.

5. A circuit according to claim 1 wherein the voltage boost temporary excess activation means comprises a resistive-capacitive network coupled to a feedback input of the voltage boost integrated circuit.

6. A circuit according to claim 1 wherein the excessive boosted output voltage exceeds the circuit's steady-state boosted output voltage by at least 20%.

7. A circuit according to claim 1 wherein the excessive boosted output voltage exceeds the circuit's steady-state boosted output voltage by at least 50 V.

8. A circuit according to claim 1 wherein the excessive boosted output voltage decays with a time constant of substantially 1.8 seconds.

9. A circuit according to claim 1, wherein the gas discharge lamp loads have filaments, further comprising boost activation delay means for providing a delay period before the voltage boost means is activated for heating the filaments.

10. A circuit according to claim 9 delay period is substantially ⅜ seconds.

11. A circuit according to claim 1 arranged to drive at least one fluorescent lamp.

12. A circuit for driving at least one fluorescent lamp having heatable filaments, the circuit comprising:
input terminals for connection to a source of AC power;
output terminals for connection to the filaments of the fluorescent lamp;
a rectifier coupled to the input terminals for producing DC power at a first DC voltage;
inductive voltage boost means coupled to the rectifier for increasing the voltage of the DC power to either a second DC voltage or a third DC voltage;
series-resonant oscillator means coupled to the inductive voltage boost means and to the output terminals for producing AC power at a substantially constant high frequency for application to the fluorescent lamp; and
inductive voltage boost delay means for delaying the operation of the inductive voltage boost means for a period of time at start-up;
voltage boost temporary excess activation means coupled to the inductive voltage boost means for activating the inductive voltage boost means to cause the voltage boost means to produce DC power at the third DC voltage, the third DC voltage higher than the second DC voltage, during a temporary activation period.

* * * * *